July 1, 1924.
W. T. SEARS ET AL
1,499,412
DRILLING MACHINE
Filed Feb. 21, 1921
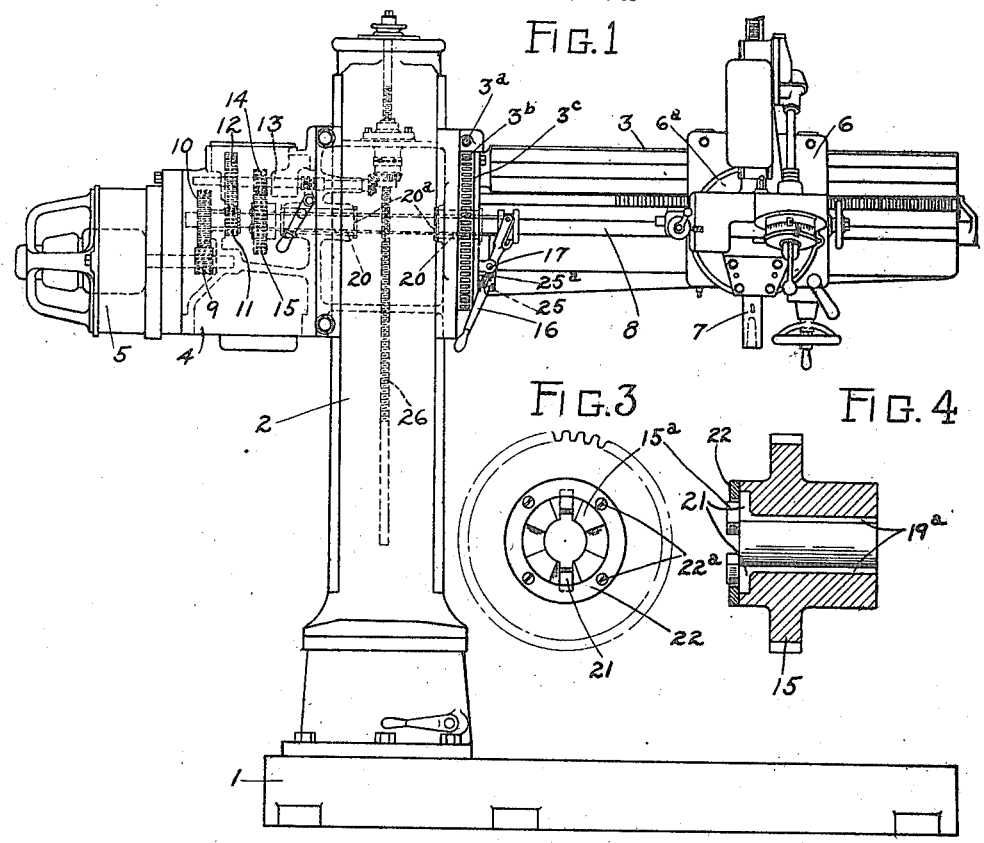
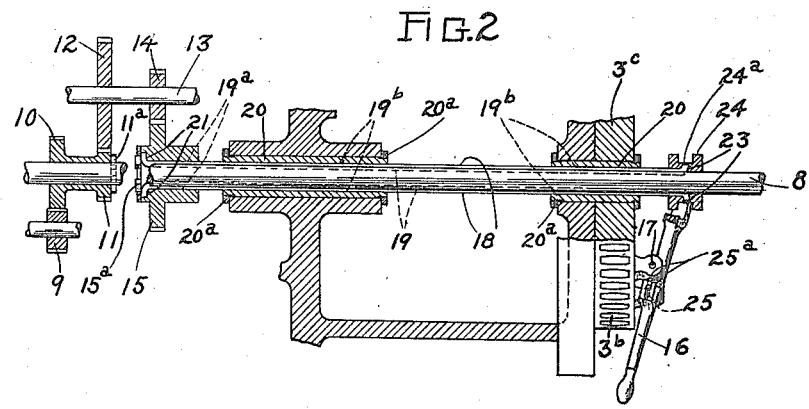
Inventor
W. T. Sears
R. K. Rausch
By Joseph K. Schofield
Attorney Patented July 1, 1924.

1,499,412

UNITED STATES PATENT OFFICE.

WILLARD T. SEARS, OF MONTCLAIR, AND ROSWELL H. RAUSCH, OF PLAINFIELD, NEW JERSEY, ASSIGNORS TO NILES-BEMENT-POND COMPANY, OF NEW YORK, N. Y., A CORPORATION OF NEW JERSEY.

DRILLING MACHINE.

Application filed February 21, 1921. Serial No. 446,547.

*To all whom it may concern:*

Be it known that we, WILLARD T. SEARS and ROSWELL H. RAUSCH, citizens of the United States, residing, respectively, at Montclair, in the county of Essex, and Plainfield, in the county of Union and State of New Jersey, have invented certain new and useful Improvements in Drilling Machines, of which the following is a specification.

This invention relates to radial drilling machines and particularly to an improved arrangement for controlling the spindle drive change speed gearing thereof. The drilling machine disclosed in Patent No. 1,296,863 to W. T. Sears comprises a vertically divided column, an arm supported for vertical adjustment between the parts of the column, a drill spindle mounted on the arm at one side of the column, change speed gearing on the arm at the other side of the column for operating the spindle, and means comprising a handle on the arm adjacent the change speed gearing for shifting the change gear or gears. The primary object of our invention herein comprises a re-arrangement of the gear shifting means whereby the operating lever or handle therefor is brought to a position more convenient to the operator. As shown in the drawing, the new position of this lever is at the drill spindle side of the column, within convenient reach of the operator, the operative connection between the lever and the change speed gearing extending through the column adjacent and parallel with the arm shaft.

Referring to the figures of the drawing:

Figure 1 is a side elevation of a radial drilling machine embodying the present invention.

Fig. 2 is a framentary enlarged vertical sectional view of the spindle driving mechanism showing the invention more in detail.
Fig. 3 is a face view of the slidable gear of the change speed mechanism.

Fig. 4 is a longitudinal sectional view thereof.

The operator of a radial drilling machine ordinarily stands closely adjacent the drill spindle where he may observe the operation of the drill on the work. In the drilling machine disclosed in the above cited patent, the several parts of the drill spindle and its supporting head and saddle are controlled by means mounted on the head or saddle, and in patent application Serial No. 380,845 to W. T. Sears, filed May 12th, 1920, the column clamping mechanism is also controlled from the spindle supporting saddle. In the above cited patent and application, the change speed mechanism for rotating the drill spindle is controlled from a hand lever on the drill spindle at the side of the column opposite the drill spindle and head. The primary object of the present invention is to locate this hand lever on the drill spindle side of the column in a position more convenient to the operator.

Referring to the drawing, 1 represents the base, 2 the column and 3 the vertically adjustable arm of a radial drilling machine. In the preferred embodiment of the invention, as illustrated, the column is divided, as shown in Patent No. 1,071,590 to W. T. Sears, dated August 26th, 1913. The arm 3 or carrying member therefor extends between the two parts of the column and is suitably guided thereon for vertical movement. Rigidly mounted at the rear end of the arm is a gear casing 4 which carries an electric motor 5. Slidably mounted on the arm 3 is a saddle 6 carrying a head 6ª provided with a rotatable drill spindle 7. A driving shaft 8 extends longitudinally of the arm and serves to drive the spindle. As illustrated in Fig. 1, the drill supporting head 6ª is mounted for angular adjustment about a horizontal axis on the saddle 6 in the usual manner, and the arm 3 is rotatably adjustable about the shaft 8 as an axis by means of a worm on a worm shaft 3ª meshing with worm teeth 3ᵇ on the supporting plate 3ᶜ of the arm. The drill spindle is rendered universally adjustable by such construction.

Mounted on the shaft of the motor 5 is a pinion 9 which meshes with a gear 10 loosely mounted on the shaft 8. Connected with the gear 10 is a pinion 11 which meshes with a gear 12 on a countershaft 13. Mounted on the shaft 13 is a pinion 14 which is adapted to mesh with a gear 15 splined on the shaft 8 and movable by means of a hand lever 16 pivoted to the arm 3 at 17. With the parts in the position shown in Fig. 1, the shaft 8 is driven at a relatively low speed indirectly from the motor through countershaft 13. When the gear 15 is moved toward the left, it is disengaged from the pinion 14 and clutch teeth 15$^a$ thereon are engaged with clutch teeth 11$^a$ at the end of the pinion 11, thus making a direct high-speed drive from the gear 10 to the shaft 8. It will be understood that the entire gear mechanism as described is mounted within the casing 4 and that this casing, with the gearing and with the motor 5, is vertically movable with the arm 3.

Referring particularly to Fig. 2, 18 designates a pair of splines engaging in keyways 19 in the shaft 8, 19$^a$ in the gear 15, and 19$^b$ in bearings 20. The splines at one end are bent into radial notches 21 in the gear 15 and are held therein by means of a ring 22 secured by screws 22$^a$. The splines at the other end are bent to engage in recesses 23 of a collar 24 slidable on the shaft 8. The lever 16 has a yoke at one end engaging in a circumferential groove 24$^a$ of the collar. It will be seen that movement of the lever 16 about its pivot 17 slides the gear 15 into either of its two driving positions. A spring-pressed pin 25 in the lever 16 is adapted to engage in either of two depressions 25$^a$ to hold the lever 16 and gear 15 in either position. It should be understood that the bearings 20 are adapted to rotate in their supports and are prevented from endwise movement by means of collars 20$^a$ on the ends thereof.

In the improved arrangement of the gear shifting mechanism, the lever 16 thereof is located on the drill spindle side of the supporting column 2 and therefore within easy reach of the operator. It should also be noted that the gear shifting means are all mounted to move coaxially of the shaft 8 upon the rotary adjustment of the arm 3 about the shaft 8, whereby this adjustment of the arm in no way effects the operation of the gear shifting means. Means, including a screw 26, is illustrated in the drawing for adjusting the arm vertically on the column, however, such means within itself comprises no part of the present invention and is fully described in the aforesaid patent.

What we claim is:

1. A radial drilling machine comprising the combination of a column, an arm vertically adjustable on the column, a shaft extending along the arm and into the column, a drill spindle carried by the arm and operatively connected to the portion of the shaft extending along the arm, mechanism comprising change speed gearing connected to the portion of the shaft extending into the column, the said mechanism being adapted to rotate the shaft, a hand operated element adjacent the column between the column and spindle, and means providing an operative connection from the said element to the change speed mechanism whereby the element is adapted to shift such mechanism to vary the speed of the shaft.

2. A radial drilling machine comprising the combination of a vertically divided column, a vertically adjustable arm carried by the column between the parts thereof, a shaft extending along the arm and into the column between the said parts, a drill spindle carried by the arm and operatively connected to the portion of the shaft extending along the arm, mechanism comprising change speed gearing adjacent and connected to the portion of the shaft extending into the column, the said mechanism being adapted to rotate the shaft, a hand lever adjacent the column between the column and spindle, and means providing an operative connection from the said lever to the change speed mechanism whereby the lever is adapted to shift such mechanism to vary the speed of the shaft.

3. A radial drilling machine comprising the combination of a column, an arm carried by the column, a shaft extending along the arm and into the column, a drill spindle carried by the arm and operatively connected to the shaft at one side of the column, change speed gearing remote from the spindle and comprising means slidable on the shaft for changing the speed of rotation of the shaft, means engaging the slidable means and extending along the shaft from within the column to a position between the drill head and the column, and a hand lever engaging the second named means at the spindle side of the column for shifting the slidable means.

4. A radial drilling machine comprising the combination of a column, an arm carried by the column, a shaft extending along the arm and into the column, a drill spindle carried by the arm and operatively connected to the shaft at one side of the column, change speed gearing comprising a gear slidable on the shaft adjacent the column for rotating the shaft, means engaging the slidable gear and extending along the shaft, and means engaging the last named means at the spindle side of the column for shifting the slidable gear.

5. A radial drilling machine comprising the combination of a column, an arm carried by the column, a drill spindle carried by the arm at one side of the column, a shaft extending along the arm through the column and operatively connected to the spindle, the arm being rotatably adjustable about the shaft as an axis, mechanism comprising change speed gearing at the other side of the column operatively connected to the shaft for rotating the same, means adjacent the shaft and extending through the column for shifting the change speed gearing, and means on the arm at the spindle side of the column for operating the last mentioned means.

6. A radial drilling machine comprising the combination of a vertically divided column, a vertically adjustable arm carried by the column between the parts thereof, a drill spindle carried by the arm at one side of the column, a shaft extending along the arm through the column and operatively connected to the spindle, the arm being rotatably adjustable about the shaft as an axis, mechanism comprising change speed gearing on the arm at the other side of the column operatively connected to the shaft for rotating the same, means adjacent the shaft and extending through the column parallel with the shaft for shifting the change speed gearing, and means on the arm adjacent the column between the column and spindle for operating the last named means.

7. A radial drilling machine comprising the combination of a column, an arm carried by the column, a shaft extending along the arm and through the column, a drill spindle carried by the arm and operatively connected to the shaft at one side of the column, change speed gearing comprising a gear slidable on the shaft at the other side of the column for rotating the shaft, means engaging the slidable gear and extending along the shaft through the column, and means engaging the last named means at the spindle side of the column for shifting the slidable gear.

8. A radial drilling machine comprising the combination of a column, an arm carried by the column, a shaft extending along the arm and through the column, a drill spindle carried by the arm and operatively connected to the shaft at one side of the column, change speed gearing comprising a gear slidable on the shaft at the other side of the column for rotating the shaft, a pair of splines slidably mounted in keyways in the shaft and extending through the column, the splines engaging the slidable gear at one end, a collar engaging the splines at the other end, and means engaging the collar for shifting the said gear.

In testimony whereof, we hereto affix our signatures.

WILLARD T. SEARS.
ROSWELL H. RAUSCH.